(12) United States Patent
Schneider

(10) Patent No.: US 10,329,751 B2
(45) Date of Patent: Jun. 25, 2019

(54) ELECTRONIC SHOWERHEAD DEVICE

(71) Applicant: Evan Schneider, Piedmont, CA (US)

(72) Inventor: Evan Schneider, Piedmont, CA (US)

( * ) Notice: Subject to any disclaimer, the term of this patent is extended or adjusted under 35 U.S.C. 154(b) by 7 days.

(21) Appl. No.: 15/231,986

(22) Filed: Aug. 9, 2016

(65) Prior Publication Data

US 2017/0096803 A1     Apr. 6, 2017

Related U.S. Application Data

(63) Continuation of application No. 29/536,002, filed on Aug. 12, 2015, now Pat. No. Des. 765,820.

(60) Provisional application No. 62/204,224, filed on Aug. 12, 2015.

(51) Int. Cl.
| | |
|---|---|
| *A47K 3/00* | (2006.01) |
| *E03C 1/05* | (2006.01) |
| *B05B 1/30* | (2006.01) |
| *B05B 12/12* | (2006.01) |
| *B05B 1/18* | (2006.01) |
| *E03C 1/04* | (2006.01) |
| *G01V 8/12* | (2006.01) |

(52) U.S. Cl.
CPC ............ *E03C 1/057* (2013.01); *B05B 1/18* (2013.01); *B05B 1/30* (2013.01); *B05B 12/122* (2013.01); *E03C 1/0408* (2013.01); *G01V 8/12* (2013.01)

(58) Field of Classification Search
CPC .. E03C 1/057; B05B 1/18; B05B 1/30; B05B 12/122

USPC ............................................................ 4/615
See application file for complete search history.

(56) References Cited

U.S. PATENT DOCUMENTS

| | | | |
|---|---|---|---|
| 5,829,072 A | 11/1998 | Hirsch et al. | |
| 6,691,340 B2* | 2/2004 | Honda | E03C 1/057 |
| | | | 4/623 |
| 6,695,281 B2 | 2/2004 | Williams | |
| 7,921,480 B2* | 4/2011 | Parsons | E03C 1/05 |
| | | | 137/624.11 |
| 8,104,113 B2* | 1/2012 | Rodenbeck | E03C 1/057 |
| | | | 251/129.03 |
| 8,876,025 B1* | 11/2014 | Wheeler | E03C 1/0408 |
| | | | 239/443 |
| 8,893,320 B2* | 11/2014 | Klicpera | B05B 12/004 |
| | | | 4/601 |
| 2009/0045268 A1 | 2/2009 | Selander et al. | |
| 2009/0293190 A1 | 12/2009 | Ringelstetter et al. | |
| 2014/0116553 A1* | 5/2014 | Schoolcraft | E03C 1/057 |
| | | | 137/801 |

FOREIGN PATENT DOCUMENTS

CN  PCT/CN2010/070237     1/2010

* cited by examiner

*Primary Examiner* — Huyen Le
(74) *Attorney, Agent, or Firm* — AKC Patents, LLC; Aliki K. Collins

(57) ABSTRACT

An electronic showerhead device for automatically controlling water flow includes a showerhead body and a presence detector located in a bottom surface of the showerhead body. The presence detector provides a presence interrogation beam area that is located above and adjacent to a parabolic water flow trajectory area of the showerhead body. Interruption of the presence interrogation beam area by a person or an object turns the water flow on.

20 Claims, 10 Drawing Sheets

ELECTRONIC SHOWERHEAD DEVICE

CROSS REFERENCE TO RELATED CO-PENDING APPLICATIONS

This application claims the benefit of U.S. provisional application Ser. No. 62/204,224 filed on Aug. 12, 2015 and entitled ELECTRONIC SHOWERHEAD DEVICE, which is commonly assigned and the contents of which are expressly incorporated herein by reference.

This application also claims the benefit of U.S. design application Ser. No. 29/536,002 filed on Aug. 12, 2015 and entitled ELECTRONIC SHOWERHEAD DEVICE, which is commonly assigned and the contents of which are expressly incorporated herein by reference.

FIELD OF THE INVENTION

The present invention relates to an electronic showerhead device and a method for automatically controlling water flow in an electronic showerhead device and in particular to an electronic showerhead device that includes an integrated power source and a sensor for automatically regulating the water flow.

BACKGROUND OF THE INVENTION

Automatic flow control for a showerhead usually involves detection of a user by a presence detector followed by activation of a valve that controls the water flow by the presence detector. The presence detector may be located near a faucet handle of a shower or within the showerhead. Most of the prior art electronic showerheads with automatic flow control require external electrical power and sensor placement by qualified technicians, which makes them difficult to install and expensive for retro-fitting existing showerheads.

Furthermore, the location of the presence detector is critical in order to avoid self-triggering of the showerhead or getting the showerhead valve locked in the ON position.

Also, the presence detectors are sensitive to the distance and the angle between the showerhead and the user and their performance is affected by the height and perimeter of the user.

Accordingly, there is a need for a water saving showerhead device that reliably and consistently turns the water automatically on when a user enters the sensing area and turns the water automatically off when the user is not in the sensing area for users with different heights and perimeters. There is also a need for an electronic showerhead that does not present the problems of self-triggering or locking the showerhead valve in the ON or OFF positions. There is also a need for an electronic showerhead that allows for a user to retrofit a conventional showerhead and attach the electronic showerhead without the need of special tools, special plumbing or electrical connections or an electrician or a plumber.

SUMMARY OF THE INVENTION

In general, in one aspect, the invention features an electronic showerhead device for automatically controlling water flow including a showerhead body and a presence detector located in a bottom surface of the showerhead body. The presence detector provides a presence interrogation beam area that is located above and adjacent to a parabolic water flow trajectory area of the showerhead body. Interruption of the presence interrogation beam area by a person or an object turns the water flow on.

Implementations of this aspect of the invention include one or more of the following. The showerhead body includes a spray nozzle located in a first area of the bottom surface of the showerhead body and the presence detector is located in a second area of the bottom surface of the showerhead body and the second area does not intersect with the first area. The showerhead body is oriented at an angle relative to a horizontal floor surface and the second area is located above the first area at a first distance. The presence detector comprises an Infrared (IR) sensor that emits a conically shaped IR presence interrogation beam. The showerhead body comprises an inlet water pipe and an electronically controlled valve that is in-line with the inlet water pipe and is activated by the presence detector. The electronically controlled valve comprises an electromagnetic "latching" solenoid. The electronic showerhead device further includes a waterproof energy package and the waterproof energy package is located within a dry portion of the showerhead body. The waterproof energy package comprises a battery pack. The electronic showerhead device further includes an ON/OFF switch and turning the switch OFF reverts the electronic showerhead device to a non-electronic showerhead device. The first distance is in the range of 0.5 inch to 2 inches. The conically shaped IR presence interrogation beam comprises a cone angle in the range of 10 degrees to 45 degrees. The angle at which the showerhead body is oriented relative to a horizontal floor surface is adjustable and is in the range of 35 degrees to 90 degrees. The presence detector is oriented at an angle relative to the bottom surface of the showerhead and this angle is adjustable. The spray nozzle comprises a plurality of openings and the number of openings and the diameter of the openings determine the curvature and size of the parabolic water flow trajectory area.

In general, in another aspect, the invention features a method for automatically controlling water flow in an electronic showerhead device. The method includes providing an electronic showerhead comprising a showerhead body and a presence detector located in a bottom surface of the showerhead body. The presence detector comprises a presence interrogation beam area that is located above a parabolic water flow trajectory area of the showerhead body and is adjacent and tangential to the parabolic water flow trajectory area. Interrupting the presence interrogation beam by a person or an object turns the water flow on.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

The present invention provides an electronic showerhead device that includes an integrated power source and a sensor for automatically regulating the water flow.

Figure 1:
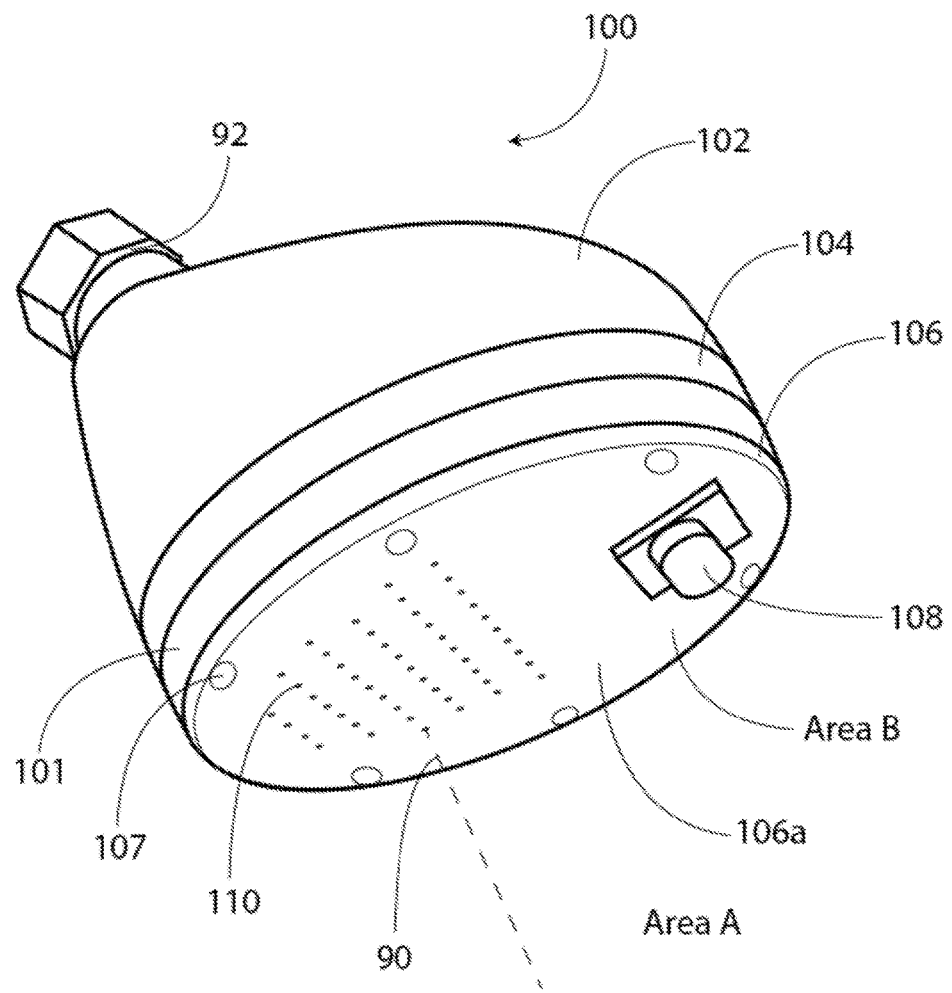
FIG. 1 depicts an electronic showerhead device of this invention.
Figure 2:
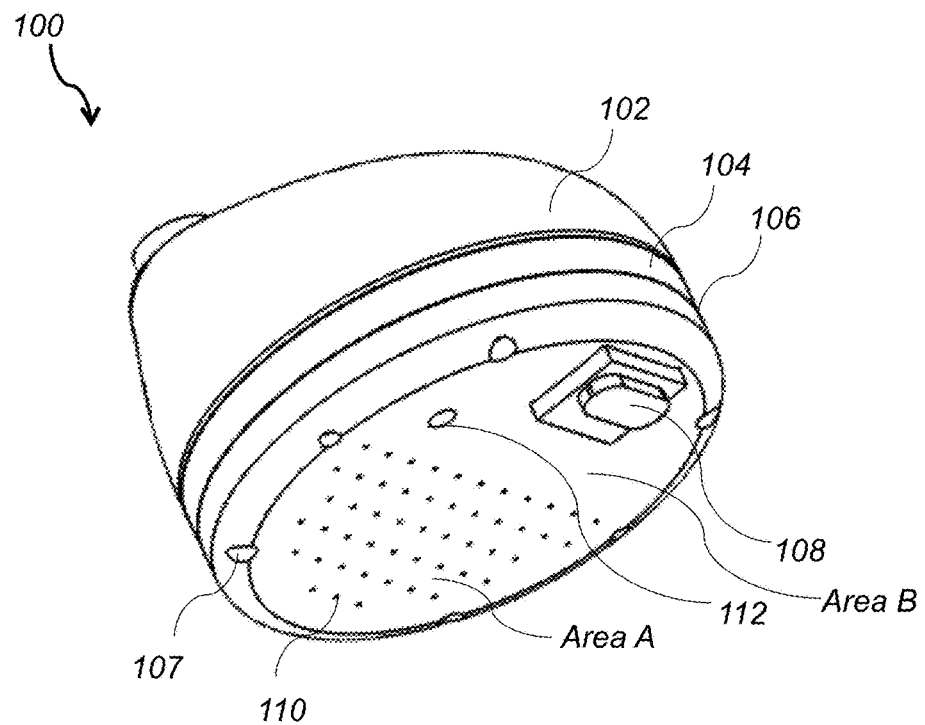
FIG. 2 is a perspective view of the electronic showerhead device of FIG. 1.
Figure 3:
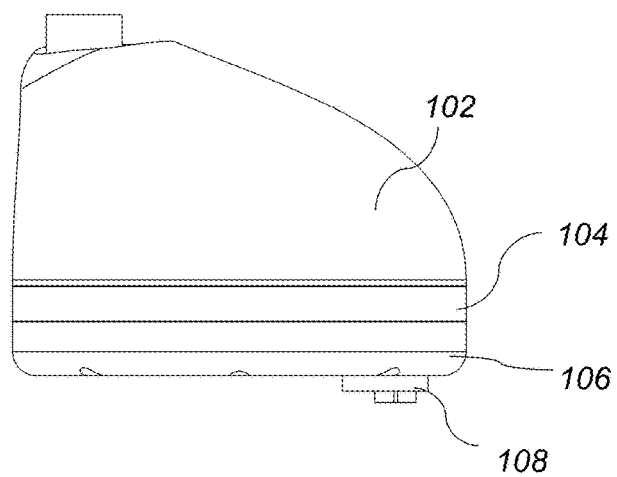
FIG. 3 is a side view of the electronic showerhead device of FIG. 2.
Figure 4:
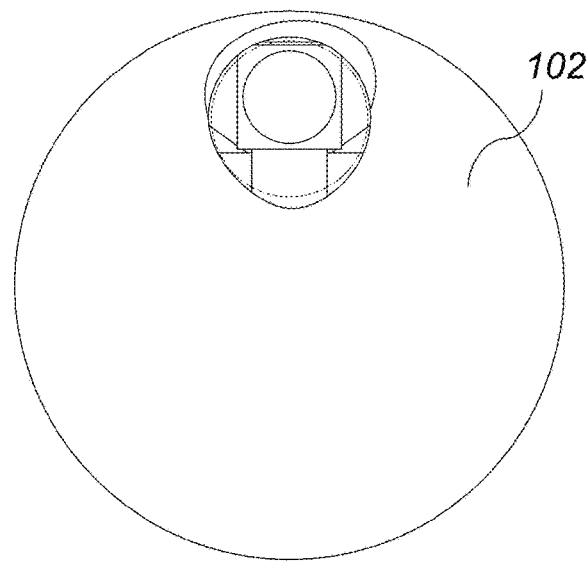
FIG. 4 is a top view of the electronic showerhead device of FIG. 2.
Figure 5:
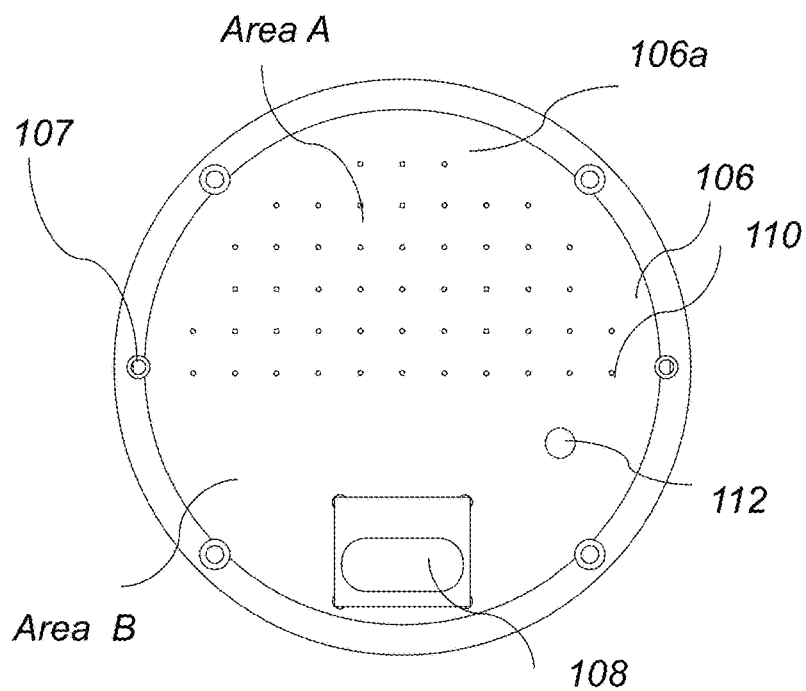
FIG. 5 is a bottom view of the electronic showerhead device of FIG. 2.
Figure 13:
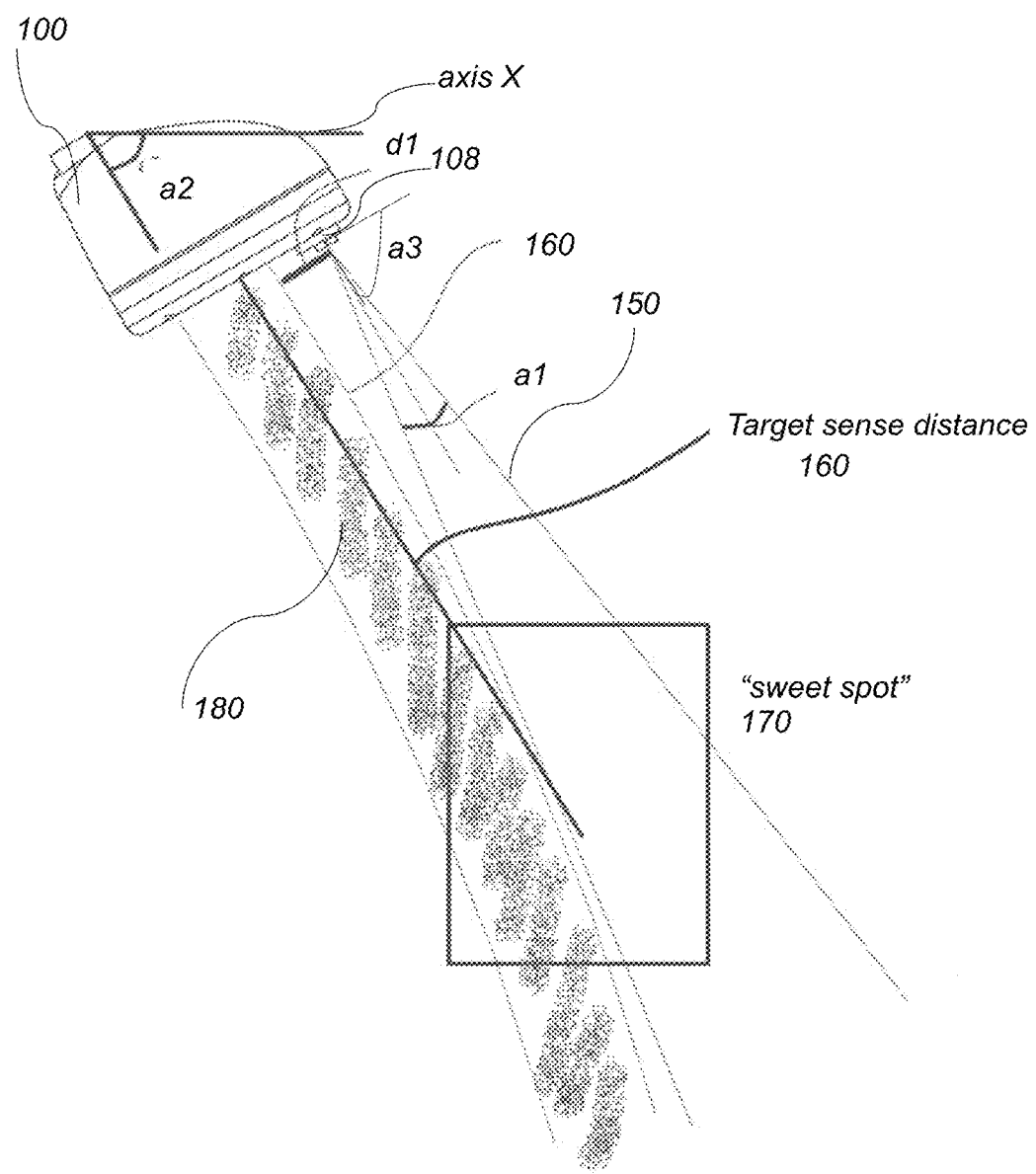
FIG. 13 is a schematic side view of the operating showerhead device of FIG. 1.

Referring to FIG. 1, electronic showerhead device 100 according to this invention includes a hollow dome-shaped top cover 102 and a two-component bottom portion 101. Bottom portion 101 includes a top component 104 and a bottom component 106. The showerhead device is attached to an inlet water pipe 92 at the top. The bottom surface 106a of bottom component 106 includes an area A with openings 110 arranged so that they form a spray nozzle. In operation, water 90 enters the showerhead 100 through the inlet pipe 92 and exits through openings 110 and forms a parabolic water stream 180, as shown in FIG. 13. Bottom surface 106a of the bottom component 106 also includes a sensor 108 protruding from an opening in area B of the bottom surface adjacent to area A. Sensor 108 is an Infrared (IR) sensor that emits a conical shaped IR beam 150 that extends above and adjacent to the water stream 180. In some embodiments, the conical shaped IR beam 150 is tangential to the water stream 180. Sensor 108 looks for reflected beam signals, and turns "ON" when a certain threshold of reflected IR energy is met or exceeded. Sensor 108 controls an ON/OFF valve for the water stream, as will be described below. Bottom surface 106a of the bottom component 106 also includes a power ON/OFF switch 112 that controls the flow of electrical power to the showerhead device 100, as shown in FIG. 2.

Figure 6:
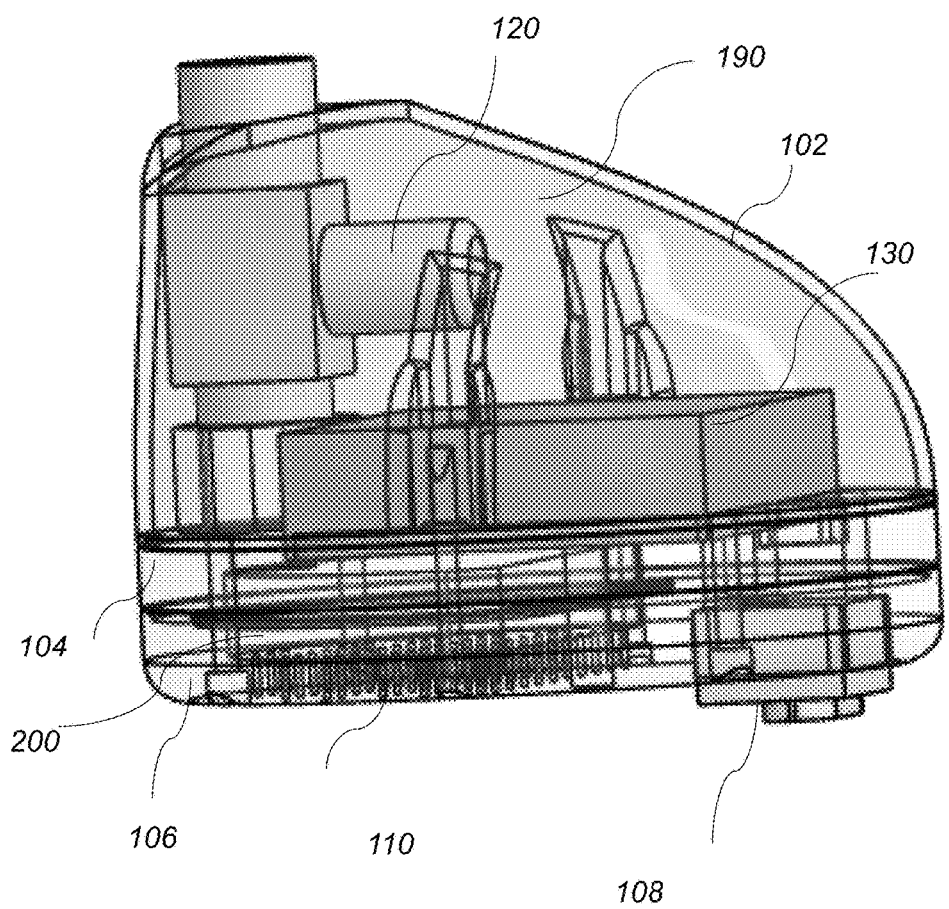
FIG. 6 is a transparent side view of the electronic showerhead device of FIG. 2.
Figure 7:
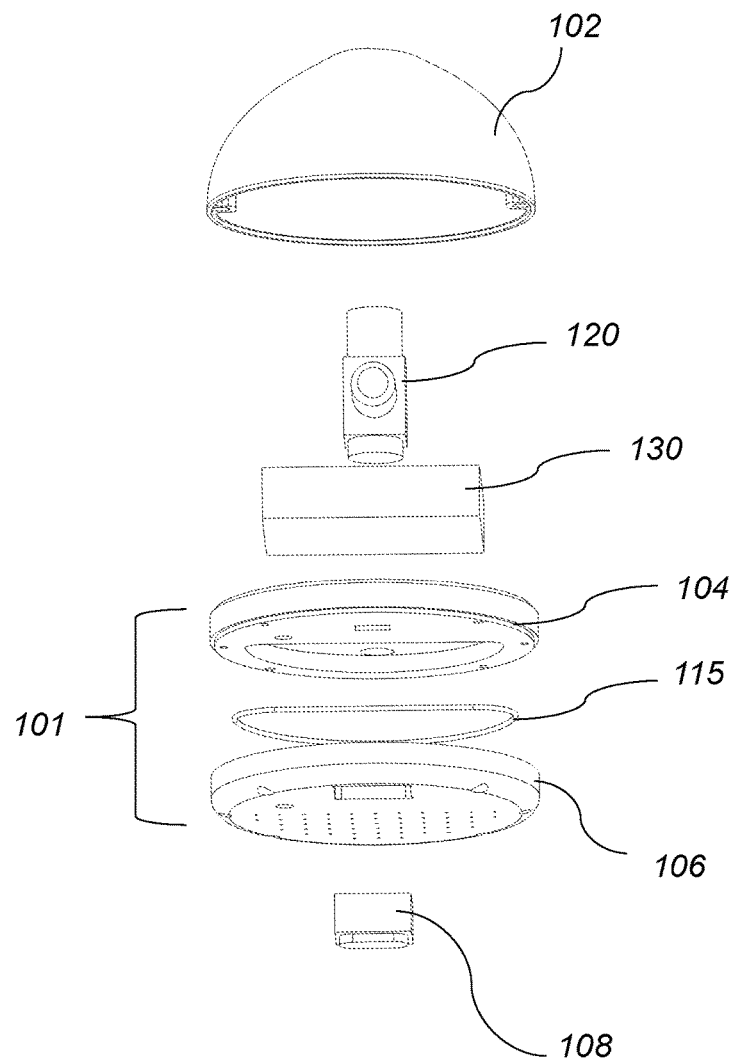
FIG. 7 is an exploded front view of the electronic showerhead device of FIG. 2.
Figure 8:
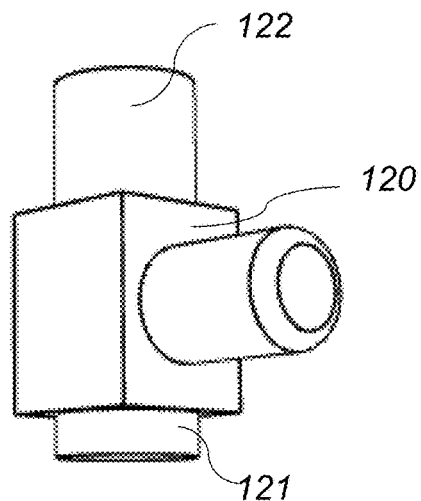
FIG. 8 is a perspective view of the solenoid of FIG. 7.
Figure 9:
FIG. 9 is a perspective view of the battery pack of FIG. 7.
Figure 10A:
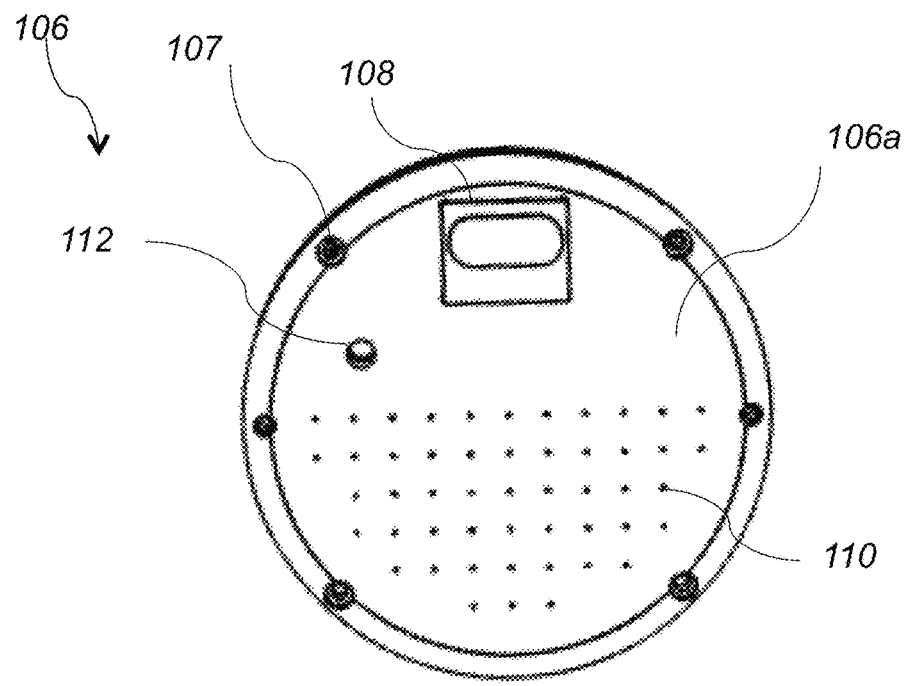
FIG. 10A is a bottom view of the bottom component of FIG. 7.
Figure 10B:
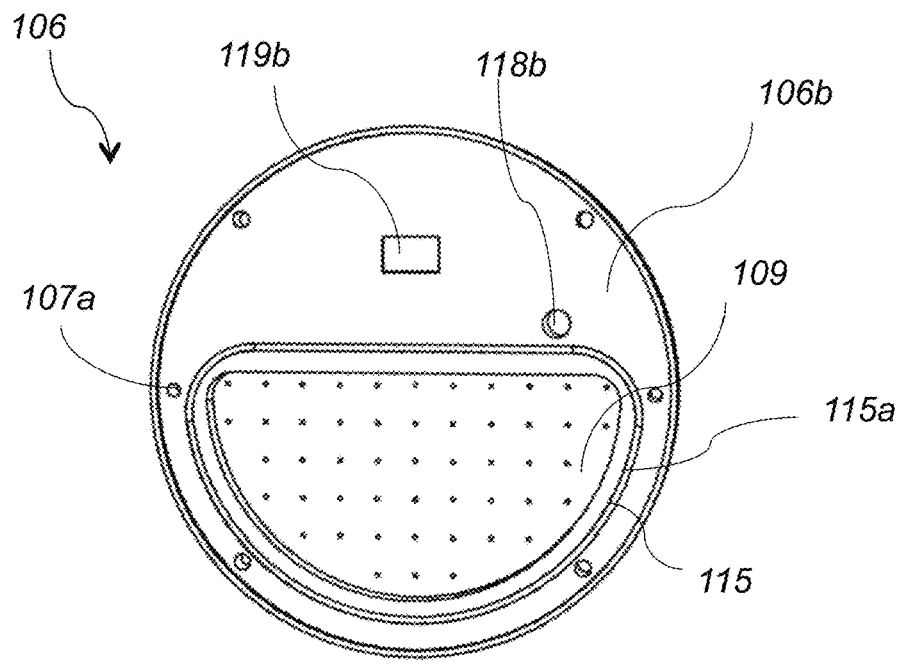
FIG. 10B is a top view of the bottom component of FIG. 7.
Figure 11A:
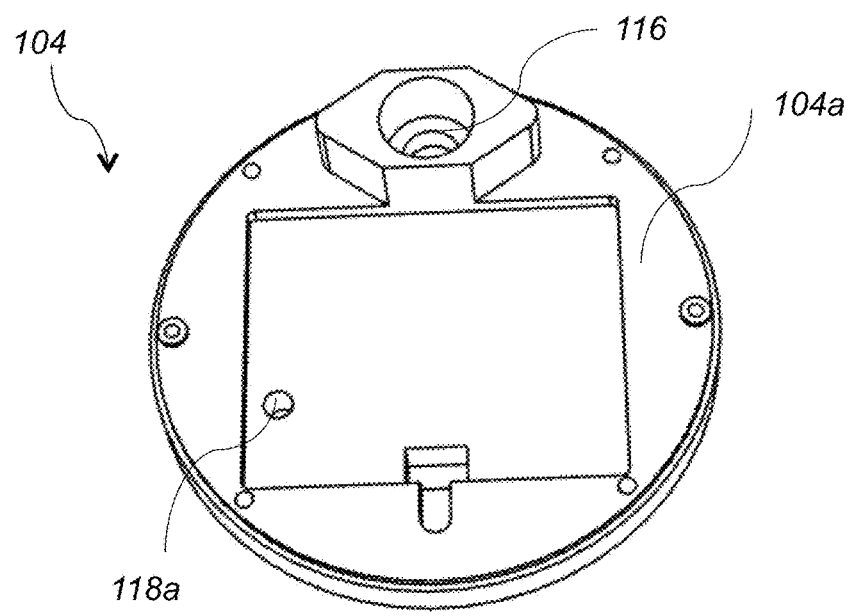
FIG. 11A is a top view of the top component of FIG. 7.
Figure 11B:
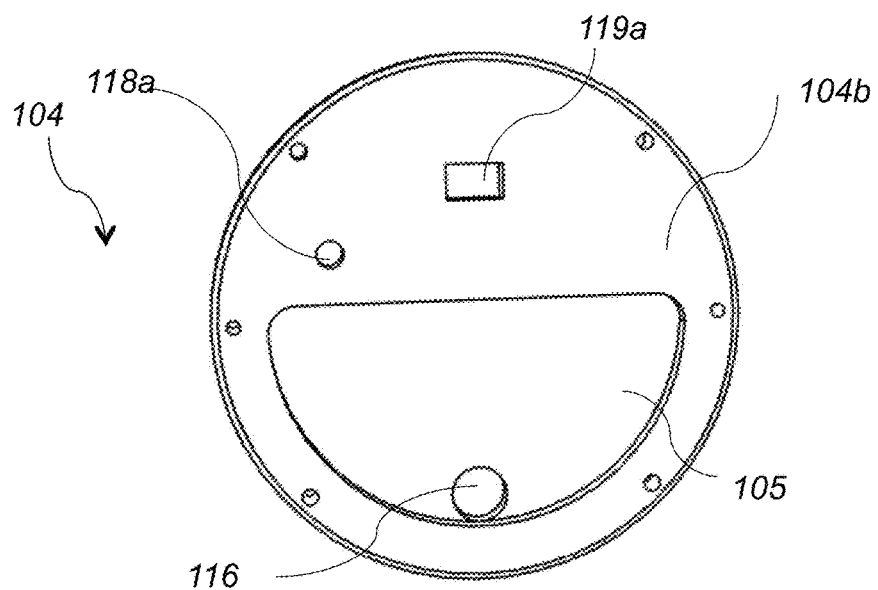
FIG. 11B is a bottom view of the top component of FIG. 7.
Figure 12:
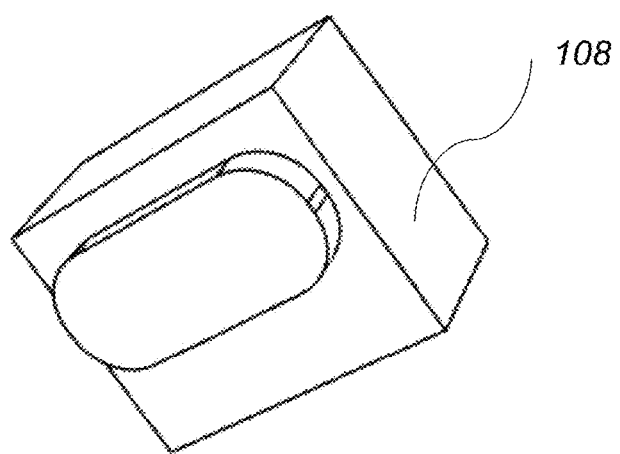
FIG. 12 is a perspective view of the sensor of FIG. 7.

Referring to FIG. 6 and FIG. 7, the electronic showerhead device 100 also includes an electronically controlled valve 120 and a battery pack 130 that are located within the hollow dome-shaped top cover 102 above the two-component bottom portion 101. In one example, the electronically controlled valve is an electromagnetic solenoid 120 that is in-line with the inlet water pipe 92 and is configured to receive an electrical signal from the IR sensor 108 and to turn ON or OFF the flow of water 90 in the water stream 180. Electromagnetic solenoid 120 is a "latching" solenoid that utilizes a permanent magnet to maintain a set position without the constant application of an external electrical current.

The latching solenoid 120 requires energy only for transitioning between the ON and OFF states and thus it is suitable for low power applications. Battery pack 130 is waterproof sealed and includes batteries that provide power to the electronic showerhead 100. Battery pack 130 is located above the bottom component 101 within the area 190 that is normally dry. In one example, the battery pack is sealed closed with an O-ring and this prevents exposure of the battery to humidity or accidental splash back.

Referring to FIG. 7, FIG. 10A-FIG. 11B, the two-component bottom portion 101 includes the top component 104 that is stacked above the bottom component 106 and an O-ring 115 arranged between the top and bottom components 104, 106. The two components 104 and 106 are held together with screws 107 that are threaded through recessed through-openings 107a formed in the perimeters of the top and bottom components 104, 106. Screws 107 are not visible from the top or the side of the showerhead and are accessible from the bottom surface 106a of the bottom component 106. The bottom surface 104b of the top component 104 includes a recessed area 105 and the top surface 106b of the bottom component 106 includes a recessed area 109. Recessed areas 105 and 109 are arranged opposite to each other and are sealed closed together with the O-ring 115 that is placed within a groove 115a surrounding the recessed area 109. A closed sealed space 200 is formed between the recessed areas 105 and 109 and water exiting the inlet pipe 92 from the bottom 121 of the solenoid 120 enters the closed sealed space 200 and exits through the openings 110 in the bottom component 106. This arrangement of the top and bottom components 104, 106 keeps the water flow within the small volume of the closed and sealed space 200 between the recessed areas 105 and 109, while the remaining components remain dry on top of the bottom portion 101. The volume in space 200 is constrained in size such that it best meets the following two requirements:

a) Large enough to serve as a constant-pressure reservoir for all nozzles (in the limit where it becomes smaller and smaller, the downstream nozzles get less flow than upstream ones)

b) Small enough to keep the device compact and preserve dry space for other components within the showerhead. Keeping it small also helps to decrease the thermal mass of the showerhead, resulting in quicker warm-up times for the shower when it is first started at the beginning of a shower session.

The top component 104 includes a through-opening 116 that is configured to receive the exiting pipe 121 from the solenoid 120. Top component 104 also includes through openings 118a and 119a that are shaped and dimensioned to receive the ON/OFF power switch 112 and the sensor 108, respectively. Bottom component 106 also includes through openings 118b and 119b that are concentric and coaxially arranged with openings 118a, 119a and are also shaped and dimensioned to receive the ON/OFF switch 112 and the sensor 108. In one example, the two-component bottom portion 101 is made of metal and the top cover 102 is made of plastic that may be colored.

Referring to FIG. 13, in operation, when a person or an object steps under the showerhead device 100, the IR beam 150 is interrupted and the sensor 108 sends a signal to the solenoid 120 that turns the flow of the water in the water stream 180 on. When the person or the object steps away from the showerhead device 100, the IR beam 150 reverts to an uninterrupted state and the sensor 108 sends another signal to the solenoid 120 that turns the flow of the water in the water stream 180 off. In order to ensure reliable and repeatable operation of the ON/OFF function, the sensor 108 is positioned in area B, that is not within but away and above the openings 110 that form the spray nozzle in area A. In this arrangement the water starts to flow below the sensor 108 and continues to fall away from the sensor 108 and forms the parabolic water stream 180 that curves away from the sensing IR beam 150. This geometric configuration is critical for the reliable operation of the sensor 108, because it prevents auto-triggering and remaining of the sensor 108 in the ON-position. This design also provides adequate water flow in the water stream 180 for providing satisfactory shower coverage and experience. In the example of FIG. 13, the showerhead 100 is arranged at an angle a2 relative to the horizontal axis X and the sensor 108 is positioned at a distance d1 away and above the openings 110 in area A, and is oriented so that it is parallel to the bottom surface of bottom component 106. In some embodiments distance d1 is adjustable. In other embodiments, sensor 108 is mounted on a pivoting gimbal so that the angle between the sensor 108 and the bottom surface of the bottom component 106 is also adjustable. The IR sensing zone 150 is arranged so that it forms a conical beam having an internal cone angle a1. The ON/OFF power switch 112 for the electrical power is co-located within the IR sensing zone 150 and is set so that when a user powers the showerhead device OFF, the solenoid 120 is first latched into the "open" state. In this "open"/OFF state, the electronic showerhead 100 functions like a typical showerhead that is controlled by manual valves. Sensor 108 may also be programmed to switch the solenoid 120 into the "open" state prior to powering off.

Furthermore, in order for the showerhead 100 to work as an intermittent showerhead that is responsive to people of average size, the shower sensor 108 needs to have a suitable detection range 160. In one example, the target sense distance 160 is in the range of 12" to 24" inches. In order for the shower stream 180 to be pleasant to the user and for the sensor to be inexpensive, the detection area 150 must not be a line but rather a region of space. This is accomplished by selecting a sensor 108 with an adequate cone angle a1. Introducing a wide detection area 150, however, opens up the possibility of sensor self-triggering events in which the water emanating from the showerhead 100 triggers the sensor 108 to remain activated indefinitely, whether or not a person is in fact in the detection area 150. In order to avoid such a problem, the detection area beam 150 must not (or only minimally) intersect the flow path of water 180. There are many variables that govern this relationship, which are described in more detail below. The key variables that determine the "sweet spot" area 170 include the sensor placement distance d1, the sensing beam cone angle a1, the angle a2 of the showerhead relative to axis X (i.e., the floor), the angle of the sensor 108 relative to the bottom surface of 106 and the water nozzle size (i.e., diameter of openings 110) and number.

i) Sensor placement relative to water exit, distance d1. The farther the sensor 108 is away from the water exit, the less likely self-detection is. However for aesthetic and usability purposes, this distance d1 should be kept to a minimum. For example, if the sensor 108 is too far away from the water stream 180, the trigger zone won't be in a flow area—the user will turn on the shower but not get wet. In one example, this distance d1 is in the range of 0.5" to 2" inches. In another example, distance d1 is 1.375" inches. In other examples, d1 is adjustable.

ii) Sensor internal cone angle (a1). Decreasing this angle a1 minimizes the probability of self-detection, but also shrinks the trigger zone. In one example this angle a1 is in the range of 10 to 45 degrees. In another example, a1 is 15 degrees.

iii) Angle of the showerhead relative to floor (a2). In one example, this angle is user-adjustable, ranging from about 35 degrees to about 60 degrees. This angle affects the trajectory of the water exiting from the shower, due to gravity. The shower must work as intended throughout this range.

iv) Angle (a3) of the sensor 108 relative to the bottom surface of the bottom component 106 of the showerhead. In one example, this angle is 90 degrees (the sensing beam emanates the shower at the same slope as the water). Decreasing this angle, so that the beam points away from the water, increases the maximum sensing distance, at the expense of an increased disparity between the sense area and flow area.

v) Water nozzle size and number. The smaller the diameter of the nozzles/openings 110 is (and the fewer nozzles there are), the faster the water will exit the shower and the straighter (less curved) its parabolic trajectory 160 will be. It is possible to tune the nozzle diameter and shape so that the tangency point between the water path 180 and the sensor cone 150 (either coincident to or offset from the sensor cone) is as close as possible to the target range (~12-24" in one example). This tangency allows for the watered area to be as close as possible to the sensor area without a self-trigger event, over the greatest vertical delta (to accommodate users of different heights). This defines the "sweet spot" area 170. In one example, the nozzle diameter is 0.040" inch and there are a total of 50 nozzles.

Among the advantages of this invention may be one or more of the following. The electronic showerhead device of this invention is a water saving device because it turns the water automatically on when the user enters the sensing area and turns the water automatically off when the user is not in the sensing area. The electronic showerhead of this invention reliably and consistently turns the water automatically on when a user enters the sensing area and turns the water automatically off when the user is not in the sensing area for users with different heights and perimeters. The electronic showerhead device of this invention does not present the problems of self-triggering or locking the showerhead valve in the ON or OFF positions. The self-contained power source allows for a user to retrofit a conventional showerhead and attach the electronic showerhead without the need for special tools, special plumbing or electrical connections or an electrician or a plumber.

Several embodiments of the present invention have been described. Nevertheless, it will be understood that various modifications may be made without departing from the spirit and scope of the invention. Accordingly, other embodiments are within the scope of the following claims.

What is claimed is:

1. An electronic showerhead device for automatically controlling water flow comprising:
   a showerhead body;
   a presence detector located in a bottom surface of the showerhead body;
   wherein the presence detector comprises a conically shaped presence interrogation beam area that is located above and adjacent to a parabolic water flow trajectory area of the showerhead body;
   wherein the conically shaped presence interrogation beam comprises a cone angle in the range of 10 degrees to 45 degrees; and
   wherein interruption of the presence interrogation beam area by a person or an object turns the water flow on.

2. The electronic showerhead device of claim 1, wherein the showerhead body comprises a spray nozzle located in a first area of the bottom surface of the showerhead body and wherein the presence detector is located in a second area of the bottom surface of the showerhead body and wherein the second area does not intersect with the first area.

3. The electronic showerhead device of claim 2, wherein the showerhead body is oriented at an angle relative to a horizontal floor surface and wherein the second area is located above the first area at a first distance.

4. The electronic showerhead device of claim 3, wherein the first distance is in the range of 0.5 inch to 2 inches.

5. The electronic showerhead device of claim 3, wherein the angle at which the showerhead body is oriented relative to a horizontal floor surface is adjustable and is in the range of 35 degrees to 90 degrees.

6. The electronic showerhead device of claim 2, further comprising an ON/OFF switch and wherein turning the switch OFF reverts the electronic showerhead device to a non-electronic showerhead device.

7. The electronic showerhead device of claim 2, wherein the spray nozzle comprises a plurality of openings and wherein the number of openings and the diameter of the openings determine the curvature and size of the parabolic water flow trajectory area.

8. The electronic showerhead device of claim 1, wherein the presence detector comprises an Infrared (IR) sensor that emits the conically shaped IR presence interrogation beam.

9. The electronic showerhead device of claim 1, wherein the showerhead body comprises an inlet water pipe and an electronically controlled valve that is in-line with the inlet water pipe and is activated by the presence detector.

10. The electronic showerhead device of claim 9, wherein the electronically controlled valve comprises an electromagnetic "latching" solenoid.

11. The electronic showerhead device of claim 1, further comprising a waterproof energy package and wherein the waterproof energy package is located within a dry portion of the showerhead body.

12. The electronic showerhead device of claim 11, wherein the waterproof energy package comprises a battery pack.

13. The electronic showerhead device of claim 1, wherein the presence detector is oriented at an angle relative to the bottom surface of the showerhead body and wherein said angle is adjustable.

14. A method for automatically controlling water flow in an electronic showerhead device comprising:
providing an electronic showerhead comprising a showerhead body and a presence detector located in a bottom surface of the showerhead body;
wherein the presence detector comprises a conically shaped presence interrogation beam area that is located above and adjacent to a parabolic water flow trajectory area of the showerhead body;
wherein the conically shaped presence interrogation beam comprises a cone angle in the range of 10 degrees to 45 degrees; and
interrupting the presence interrogation beam by a person or an object to turn the water flow on.

15. The method of claim 14, wherein the showerhead body comprises a spray nozzle located in a first area of the bottom surface of the showerhead body and wherein the presence detector is located in a second area of the bottom surface of the showerhead body and wherein the second area does not intersect with the first area.

16. The method of claim 15, further comprising providing an ON/OFF switch and wherein turning the switch OFF reverts the electronic showerhead device to a non-electronic showerhead device.

17. The method of claim 15, wherein the showerhead body is oriented at an angle relative to a horizontal floor surface and wherein the second area is located above the first area at a first distance.

18. The method of claim 14, wherein the presence detector comprises an Infrared (IR) sensor that emits the conically shaped IR presence interrogation beam.

19. The method of claim 14, wherein the showerhead body comprises an inlet water pipe and an electronically controlled valve that is in-line with the inlet water pipe and is activated by the presence detector.

20. The method of claim 19, wherein the electronically controlled valve comprises an electromagnetic "latching" solenoid.

\* \* \* \* \*